US010655466B2

United States Patent
Kabannik

(10) Patent No.: US 10,655,466 B2
(45) Date of Patent: May 19, 2020

(54) METHOD OF MONITORING OF HYDRAULIC FRACTURE CLOSURE STRESS WITH TRACERS (VARIANTS)

(71) Applicant: SCHLUMBERGER TECNOLOGY CORPORATION, Sugar Land, TX (US)

(72) Inventor: Artem Valeryevich Kabannik, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 169 days.

(21) Appl. No.: 15/780,191

(22) PCT Filed: Nov. 30, 2015

(86) PCT No.: PCT/RU2015/000829
§ 371 (c)(1),
(2) Date: May 30, 2018

(87) PCT Pub. No.: WO2017/095252
PCT Pub. Date: Jun. 8, 2017

(65) Prior Publication Data
US 2018/0363461 A1  Dec. 20, 2018

(51) Int. Cl.
*E21B 49/00* (2006.01)
*E21B 49/08* (2006.01)
(Continued)

(52) U.S. Cl.
CPC ............ *E21B 49/088* (2013.01); *C09K 8/706* (2013.01); *C09K 8/80* (2013.01); *C09K 8/805* (2013.01);
(Continued)

(58) Field of Classification Search
CPC .... E21B 49/088; E21B 49/006; E21B 43/267; C09K 8/805; C09K 8/80; C09K 8/706; C09K 8/92
See application file for complete search history.

(56) References Cited

U.S. PATENT DOCUMENTS 4,665,984 A   5/1987  Hayashi et al.
4,671,909 A   6/1987  Torobin
(Continued)

FOREIGN PATENT DOCUMENTS

EP   0490421 A1   11/1991
GB   2489714 A    10/2012
(Continued)

OTHER PUBLICATIONS

Veatch Jr., R.W. and Moschovidis, Z.A. 1986. "An Overview of Recent Advances in Hydraulic Fracturing Technology". Presented at the International Meeting on Petroleum Engineering, Beijing, China, Mar. 17-20. SPE-14085-MS, pp. 421-454.
(Continued)

*Primary Examiner* — Brad Harcourt

(57) ABSTRACT

The present disclosure relates to the hydrocarbon production, in particular to measuring the fracture closure pressure in a formation penetrated by a wellbore using marker agents. According to this disclosure, a wellbore is provided; a clean fracturing fluid is injected into the wellbore thus creating a fracture in the formation; the fracturing fluid is injected into the well, wherein the fracturing fluid comprises a mixture of a proppant and one or more groups of capsules with the predetermined range of breaking strength values and comprising a marker agent that corresponds to each predetermined range of breaking strength values, wherein capsules of different groups comprise different marker agents and are designed to precipitate in the fracture and release the marker agent in case the fracture closure pressure exceeds the
(Continued)

predetermined range of breaking strength values due to fracture closure; the marker agent production to the surface is provided; the marker agent is detected at the surface; and the fracture closure pressure is measured based on the detected marker agent based on the breaking strength range of the capsule in the corresponding group of capsules.

15 Claims, 4 Drawing Sheets

(51) Int. Cl.
*E21B 43/267* (2006.01)
*C09K 8/92* (2006.01)
*C09K 8/80* (2006.01)
*C09K 8/70* (2006.01)

(52) U.S. Cl.
CPC .............. *C09K 8/92* (2013.01); *E21B 43/267* (2013.01); *E21B 49/006* (2013.01)

(56) References Cited

U.S. PATENT DOCUMENTS

| | | | |
|---|---|---|---|
| 4,733,567 A | 3/1988 | Serata | |
| 4,744,831 A | 5/1988 | Beck | |
| 4,899,320 A | 2/1990 | Hearn et al. | |
| 5,050,690 A | 9/1991 | Smith | |
| 5,212,143 A | 5/1993 | Torobin | |
| 5,277,062 A | 1/1994 | Blauch et al. | |
| 5,492,175 A | 2/1996 | El-Rabaa et al. | |
| 5,517,854 A | 5/1996 | Plumb et al. | |
| 5,967,232 A | 10/1999 | Rhett | |
| 6,705,398 B2 | 3/2004 | Weng | |
| 8,838,427 B2 | 9/2014 | Segal et al. | |
| 2006/0052251 A1 | 3/2006 | Anderson et al. | |
| 2010/0307745 A1* | 12/2010 | Lafitte | C09K 8/62 166/250.12 |
| 2011/0237465 A1 | 9/2011 | Lee et al. | |
| 2012/0285695 A1 | 11/2012 | Lafferty et al. | |

FOREIGN PATENT DOCUMENTS

| | | |
|---|---|---|
| RU | 2569143 C1 | 11/2015 |
| SU | 1682541 A1 | 10/1991 |
| WO | 2008054118 A1 | 5/2008 |
| WO | 2009078745 A1 | 6/2009 |

OTHER PUBLICATIONS

Mark de Berg et al., "Computational geometry: algorithms and applications", Third Edition, Springer, 2008, 388 pages.
James M.Gere, "Stresses in Beams (Basic Topics)", Mechanics of Materials, Sixth Edition, 2004, Chapter 5, pp. 300-392.
James M.Gere, "Stresses in Beams (Advanced Topics)", Mechanics of Materials, Sixth Edition, 2004, Chapter 6, pp. 393-417.
James M.Gere, "Review of Centroids and Moments fo Inertia", Mechanics of Materials, Sixth Edition, 2004, Chapter 12, pp. 828-857.

* cited by examiner

METHOD OF MONITORING OF HYDRAULIC FRACTURE CLOSURE STRESS WITH TRACERS (VARIANTS)

FIELD OF THE DISCLOSURE

The present disclosure relates to hydrocarbon production, in particular to measuring the fracture closure pressure using marker agents in a formation penetrated by a wellbore.

BACKGROUND

The known prior art solution WO 2009078745 A1 "Proppant flowback control using encapsulated adhesive materials" discloses a hydraulic fracturing method, wherein the sand flowback from a fracture is prevented by means of injecting an encapsulated tackifying agent mixed with a proppant into a subterranean formation. In the above known method, at the first stage, the fracture is filled with the proppant mixed with the encapsulated tackifying agent. The content of the tackifying agent ranges from 0.01 to 20% of the total amount of the proppant. The encapsulated tackifying agent and the proppant may be pre-mixed or mixed at the well site followed by introduction into the subterranean formation. At the second stage, the fracture closure pressure forces the capsules to break and release the tackifying agent.

The materials used to manufacture the shell for encapsulating the tackifying agent include polyesters, polyolefins, high and low-density polyethylene, and polypropylene. The shell may also be made of insoluble polymeric components, such as polyesters, polyarylates, polyamides, phenol-aldehyde resins, and mixtures thereof. Suitable thicknesses of the capsule shells range from 0.01 to 1 mm. Suitable dimensions of the capsules comprising the tackifying agents range from 0.25 to 3.36 mm.

The above known solution serves to prevent the proppant flowback from the fracture.

The prior art solution WO2012155045A3 "Destructible containers for downhole material and chemical delivery" describes a method of treating a downhole region penetrated by a wellbore with a treatment agent, wherein the method comprises: delivering the agent enclosed in one or more destructible capsules to the well site; placing one or more destructible capsules in the fluid to be injected into the well; and mechanically breaking one or more destructible capsules in the well or in the rock to release the treating agent. Also, a method of treating a subterranean formation penetrated by a well with a solid bridging material, which includes fibers, flakes, or specially selected blends of multisized particles, is provided, wherein the method comprises delivering the solid bridging material enclosed in one or more destructible capsules to the well site; placing one or more destructible capsules in the fluid to be injected in the well; and mechanically breaking one or more destructible capsules in the well to release the solid bridging material in the well.

The above known solution is intended to inject the bridging material into the fracture.

In the prior art solution WO2010020351A1 "Release of Chemical Systems for Oilfield Applications by Stress Activation", a system is provided, which is employed in the hydrocarbon production, using the encapsulating material (B) and component (A), wherein the component (A) is contained within the above encapsulating material (B), and the above encapsulating material (B) is designed to break and release the component (A) if the pressure drops by more than 10 bars.

An embodiment of the above solution discloses the arrangement using the encapsulating material (B) and the component (A), wherein the component (A) is contained within the above encapsulating material (B). The system also includes the carrier fluid (C) that transfers said encapsulating material (B) and the component (A) contained therein, wherein said encapsulating material (B) is designed to break and release said component (A) under sufficiently stressed conditions.

The used encapsulating material (B) can be designed in the form of a flexible capsule made of gelatin, pectin, cellulose derivatives, acacia gum, guar gum, locust bean gum, tara gum, cassia gum, agar or n-octenylsuccinate, starch, porous starch, pectin, alginates, carrageenans, xanthan, chitosan, scleroglucan, diutan, and mixture thereof. In the embodiment of the above known solution, the encapsulating material comprises a mixture of gelatin and acacia gum. Gelatin to acacia gum mass ratio ranges from 9:1 to 1:9, in most cases from 5:1 to 1:5, first of all from 2:1 to 1:2, and the most acceptable ratio is 1:1. According to the above known solution, the capsule diameter ranges from 1 to 5,000 microns, in most cases diameter ranges from 10 to 2,000 microns.

The above known solution is used for delivery of chemical materials into the well during well drilling.

In-situ formation stress is measured by means of injecting the fluid into/out of the formation, fracturing, and measuring the fracture closure pressure. A review of such techniques can be found in (Veatch Jr., R. W. and Moschovidis, Z. A. 1986. An Overview of Recent Advances in Hydraulic Fracturing Technology. Presented at the International Meeting on Petroleum Engineering, Beijing, China, 17-20 March. SPE-14085-MS). These approaches are efficient for HF, but they are cost-intensive and complicated to employ in the course of well production.

In the prior art solution RU 2386023 C1 "A METHOD TO DETERMINE THE HYDRAULIC FRACTURE CLOSURE PRESSURE", a method of assessing the fracture closure pressure by means of sending a series of pressure pulses into the well using surface equipment and sensing the well response to the pressure pulses by pressure gauges is provided. At the same time, the bottomhole pressure corresponding to each pulse is measured. An average fracture width is derived using a mathematical model of the pressure pulses propagation within the wellbore and the fracture. Moreover, a ratio of the simulated average fracture width to the derived bottomhole pressure is derived. This ratio is extrapolated to a zero-width point, while the closure pressure is determined as a bottomhole pressure corresponding to the zero width.

The above solution may be used in the condition of open fracture, which can be achieved by means of injecting fluid into the well (well intervention).

The prior art solutions do not provide any techniques directed to using capsules filled with various marker agents (tracers) and characterized by different breaking strengths corresponding to these marker agents to determine the fracture closure pressure both during well stimulation by hydraulic fracturing and in the course of the long-term monitoring of the reservoir pressure associated with the reservoir depletion due to the hydrocarbon production in the well. Additionally, no information is disclosed regarding capsules injecting into the hydraulic fracture and release of the marker agents from the capsules with the breaking strength below the current closure pressure in the fracture, as well as detecting the marker agents produced at the surface and matching the marker agents to the corresponding value of the fracture closure pressure.

Alternative prior art solutions designed to measure the fracture closure pressure without using the marker agents involve well operation intervention, for example, by injecting the fluid into the fracture.

Knowledge of the main stresses in the formation and determining the fracture closure pressure due to the fracture closure it is found out at stages of well operation with hydraulic fracturing. During well stimulation: it determines the proppant strength, the fracturing pressure, and the fracture direction. During the production operations, it helps to predict stability and sand production in the well.

Therefore, there is a interest in a low-cost and non-invasive technique to determine the fracture closure pressure both during the well stimulation by hydraulic fracturing and during the long-term monitoring of the reservoir pressure associated with the reservoir depletion due to the hydrocarbon production in the well.

SUMMARY

The present disclosure provides a method of determining the fracture closure pressure in a formation penetrated by a wellbore. According to the claimed method of determining the fracture closure pressure in the formation penetrated by the wellbore, wherein: the wellbore is provided; the clean fracturing fluid is injected into the wellbore, thus creating a fracture in the formation; the fracturing fluid is injected in the wellbore, wherein the fracturing fluid comprises a mixture of the proppant and one or more groups of capsules comprising the capsules having the predetermined range of breaking strength values and comprising a marker agent that corresponds to each predetermined range of breaking strength values; wherein capsules from different groups comprise different markers agents and are designed to remain in the fracture and release the marker agent in case when the fracture closure pressure exceeds the predetermined breaking strength values due to the fracture closure; the marker agent is produced from the well; the marker agent is detected at the surface; and the fracture closure pressure is determined based on the detected marker agent considering the range of breaking strength values of the capsule in the corresponding group of capsules.

Another embodiment provides a method employed during the hydrocarbon production in the well.

BRIEF DESCRIPTION OF THE DRAWINGS

The embodiments of this disclosure are described in more detail by means of drawings, wherein.

DETAILED DESCRIPTION

Hydraulic fracturing is a method of stimulating the hydrocarbon production from the well by means of creating high-permeability zones loaded with a proppant. The proppant pack prevents fracture closure and provides for the free flow of hydrocarbons during production. Knowledge of the main stresses in the formation in demand at all stages of well operation with hydraulic fracturing: at the stimulation stage (it determines the proppant strength, the fracturing pressure, and the fracture direction), while at the production stage, it helps to predict well stability and sand production in the well.

This description discloses a low-cost and non-invasive method of monitoring the fracture closure pressure caused by the fracture closure. The present method may be employed for measuring the fracture closure pressure during well stimulation through hydraulic fracturing as well as for the long-term monitoring of the pressure increase in the reservoir due to the reservoir depletion as a result of the hydrocarbon production from the well.

Figure 1:
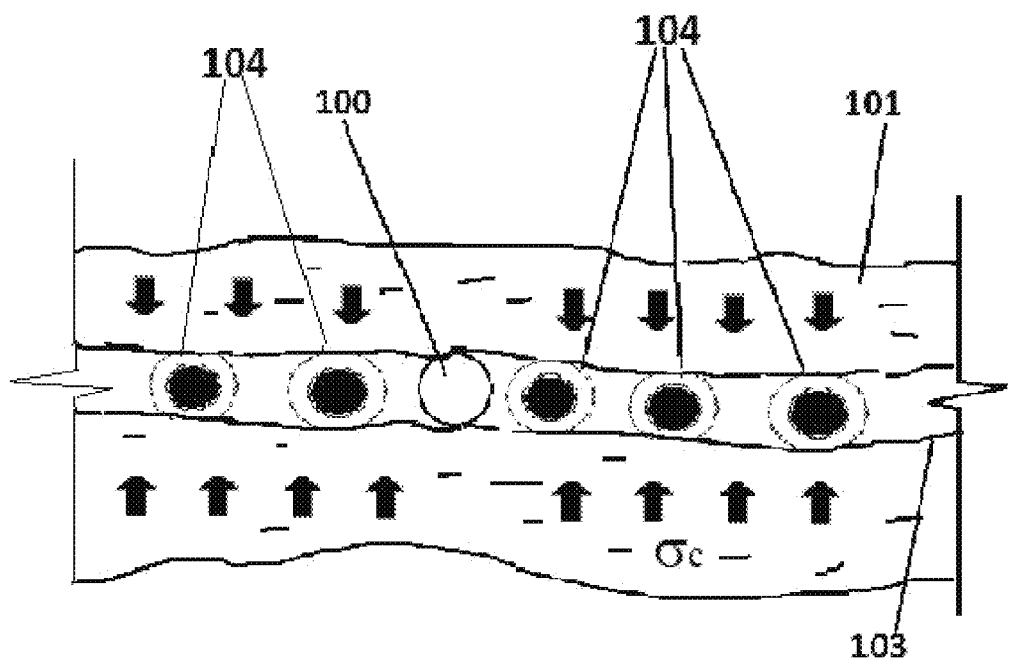
FIG. 1 illustrates the marker agent release from a capsule if the fracture closure pressure $\sigma_c$ exceeds the breaking strength of the corresponding capsule due to the fracture closure, while the marker agents contained in the capsules with a greater breaking strength remain within the fracture.

According to the proposed technique, FIG. 1 demonstrates a well 100, which penetrates an oil and gas bearing reservoir 101, wherein a clean fracturing fluid is injected, which forms at least one fracture 103.

Then the fracturing fluid, which comprises a mixture of a proppant and a group 104 of capsules comprising one or more capsules with a predetermined range of breaking strength values and a predetermined marker agent that corresponds to the predetermined breaking strength value, is injected into the well 100.

Figure 2:
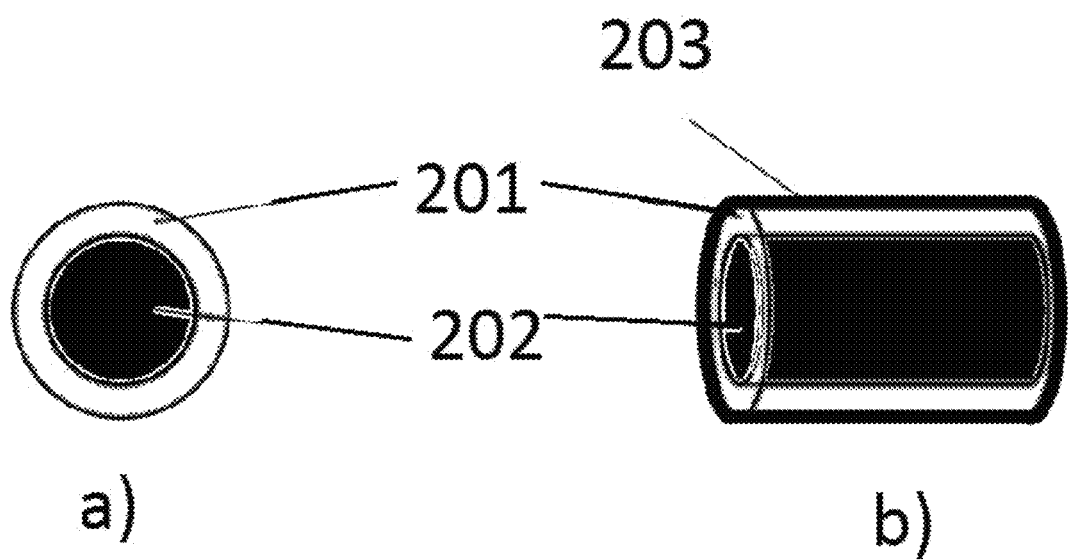
FIG. 2 illustrates embodiments of hard-shell capsules. a) spherically shaped embodiment, b) cylindrically shaped embodiment.
Figure 3:
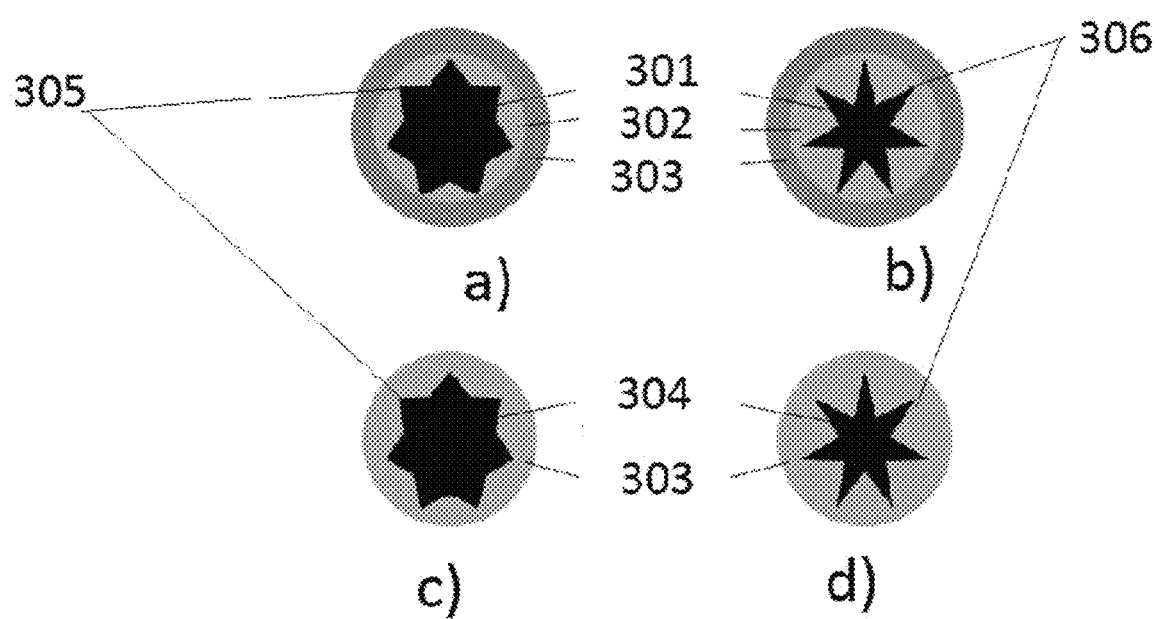
FIG. 3 illustrates embodiments of soft-shell and hard-frame capsules.

The capsule shapes are shown in FIG. 2 and FIG. 3 and may vary; for example, they can be spherical, cylindrical, or almond-shaped. The capsules weight and sizes are close to those of the proppant.

The capsules of spherical and cylindrical shapes shown in FIG. 2 are of special interest. The spherical shape shown in FIG. 2 a) is advantageous from the aspects of both providing the predetermined proppant pack permeability and using a known capsules manufacturing technology, for example, as provided in solutions U.S. Pat. Nos. 4,671,909, 4,744,831, and 5,212,143. The spherical capsule is made of a hard shell 201 and a marker agent 202 contained within the hard shell. The advantages of the cylindrical shape shown in FIG. 2 b) relate to the simplicity of the manufacturing process. A cylindrical capsule is characterized by simple manufacturing process: the hard shell 201 is designed as a tube filled with the marker agent 202. The tube provides for the mechanical hardness of the capsule. Furthermore, the cylindrical capsule is coated with an insulating shell 203 that serves to protect the marker agent from the downhole environment, as well as to preserve the capsule integrity and to prevent early release of the marker agent, which is not caused by the fracture closure pressure exceeding the predetermined breaking strength value. For example, the insulating shell may consist of a mixture of gelatin and acacia gum.

For both spherical and cylindrical shapes, the thickness of the hard shell and the characteristics of the material used to make the hard shell impact the capsule breaking strength, which means that these characteristics predetermine the pressure, which will lead to the release of the predetermined marker agent caused by the fracture closure.

Apart from the hard shell thickness and the manufacturing material, the capsule breaking strength is also influenced by the presence, number, and dimensions of irregularities (furrows or grooves) made in the external or internal surface of the shell. Therefore, the aforementioned irregularities predetermine the capsule breaking strength value as well.

Before use, the capsules are subjected to testing for breaking strength. For testing, the test samples are selected from each group that are subjected to the laboratory pressures similar to the downhole pressures. The pressure ranges, at which the test samples (mixture of the proppant particles with the capsules having the predetermined breaking strength) are broken, are further assigned to the corresponding groups as the predetermined ranges of the breaking strength values.

The examples of the chemical indicators used in this disclosure are provided in solution US20060052251 and may be chosen from a group comprising trifluorobenzene, rhodamine, flourobenzoic acids, polynuclear aromatic hydrocarbons, and halogenated hydrocarbons.

Other marker agents may be used as well, for example, fluorescent and photospectral markers, radioactive, magnetic, and conducting markers agents. The number of different groups of capsules with different marker agents is considered sufficient for conducting the predetermined number of measurements in the interest period of time. In case the pressure $\sigma_c$ in the formation exceeds the predetermined range of breaking strengths of one group of capsules and the marker agent is produced at the surface and sets a measuring point $t_1$, the rest of the marker agents in other groups with different predetermined ranges of breaking strengths remain inside their capsules in the fracture until the increasing pressure in the fracture exceeds the range of breaking strength values of the next group of capsules and releases the next portion of another marker agent that will be produced at the surface and set another measuring point $t_2$, wherein the determination of this point provides the next pressure value. Then the increasing pressure releases the marker agent of the nth group of capsules, and the nth marker agent emerges to the surface and sets a measuring point $t_n$, wherein the determination of this point provides the pressure value n. This process goes on until either the last group of capsules (with the highest breaking strength) is broken (crashed), or the pressure increase stops at the value below the breaking strength of the remaining groups of capsules.

In case the number of measuring points $t_n$ exceeds the number of the available marker agents, the previously used marker agents may be used again and placed into the capsules with different breaking strengths, thereby reusing the same marker agents. The time period between the points of detection of the same marker agents longer than the time period for the marker agent complete release. In addition, the range of breaking strength values of one group of capsules not overlap with the range of breaking strength values of another group of capsules.

This disclosure provides several embodiments of capsules.

In an embodiment shown in FIG. 2, a marker agent 202 is placed within an empty hard shell 201. After settling together with proppant in a fracture, the capsules are subjected to the increasing fracture closure pressure caused by the fracture closure directly after the hydraulic fracturing of the formation or as a result of the fracture closure caused by the pressure increase due to the reservoir depletion in the long term. When the fracture closure pressure exceeds the breaking strength of such a capsule, it breaks apart and releases the marker agent. This agent is detected after emerging to the surface or by analyzing the fracturing and clean-up fluid flowback, or during the hydrocarbon production from the well.

In another embodiment shown in FIG. 3 a), b), a hard frame 301 coated with a soft shell 303 is used instead of a hard shell, wherein as the fracture closure pressure increases due to the fracture closure, the hard frame breaks the soft shell from the inside and the marker agent 302 contained between the soft shell and the hard frame is released. For example, under pressure applied to the capsule, the hard frame of the capsule cuts the soft shell, which releases the agent.

In yet another embodiment shown in FIGS. 3 c) and d), the capsule comprises a hard frame 304 that consists of a marker agent and is coated with the soft shell 303, wherein as the fracture closure pressure increases due to the fracture closure, the hard frame breaks the soft shell and the marker agent contained in the hard frame is released.

In these embodiments, the hard frame comprises one or more elements 305, 306 that serve to destroy the soft shell, for example, made as a needle or a sharp edge.

In this case, the breaking strength of the capsule is determined by the sharpness of the frame elements: the less sharp elements, for example, the sharp edges 305 shown in FIGS. 3 a) and c) release a marker agent under greater pressure than the sharper elements made as needles 306 shown in FIGS. 3 b) and d).

Accordingly, the elements dimensions and manufacturing material for the hard frame and the soft shell set the predetermined breaking strength value.

Figure 4:
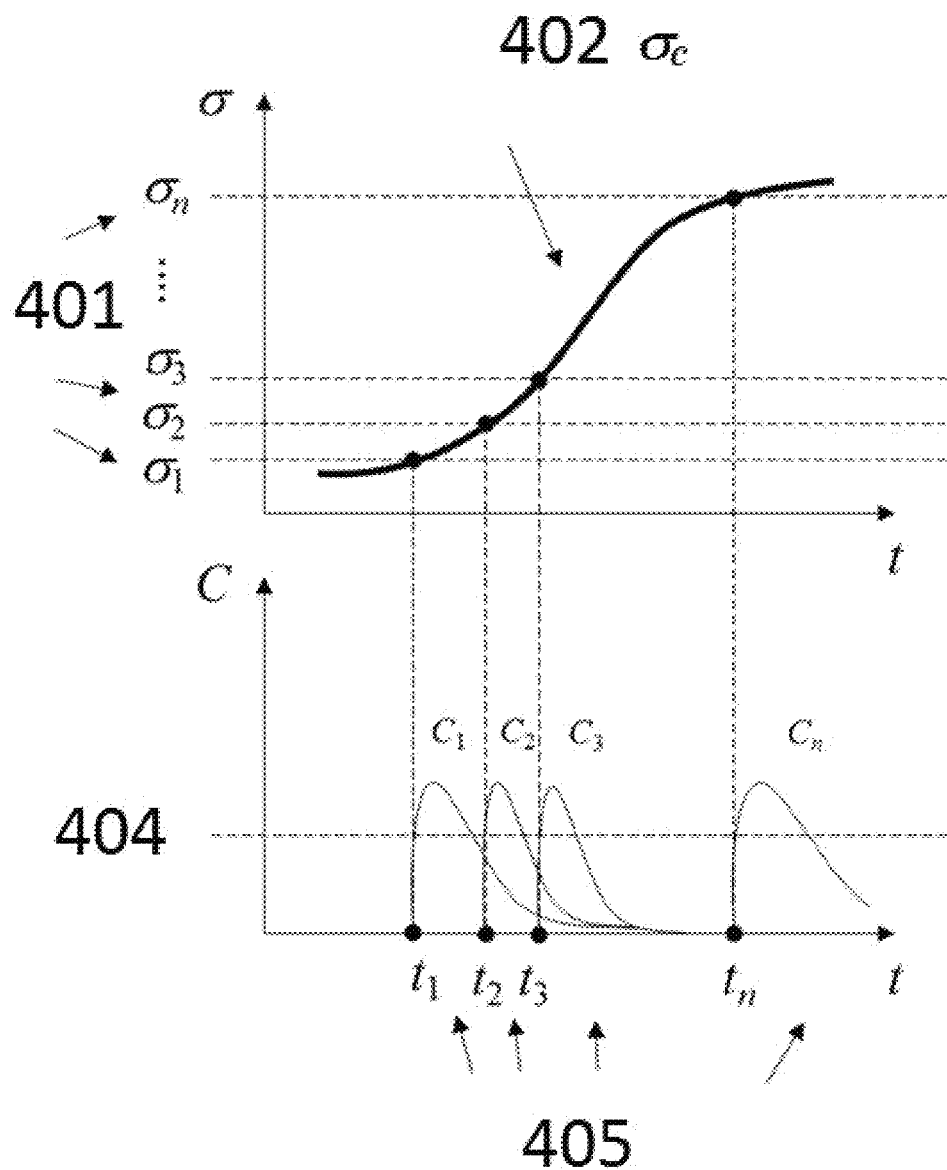
FIG. 4 illustrates determining the fracture closure pressure, which corresponds to the detected marker agent, based on the capsule breaking strength value for the corresponding group of capsules using the fracture closure pressure $\sigma_c$ profile and by matching the capsule breaking strength $\sigma_n$ with the detection times tn for the corresponding marker agents by their concentrations $C_n$.

In order to monitor the fracture closure pressure caused by the fracture closure, the samples of the flowback fluid, clean-up fluid, or fluid produced from the well are taken and used to determine the concentration of the predetermined marker agent in the sample as well as the time period, during which the concentration of the predetermined marker agent exceeds the predetermined concentration threshold. The time point, when the concentration of a certain marker agent exceeds a certain threshold corresponding to the minimal concentration of the marker agent in the sample, which can be detected by the equipment used for detecting and determining the concentration of the marker agent in the sample, becomes a measuring point for the breaking strength value of the corresponding capsules (release pressure). The values of the release pressure of the marker agent obtained in the measuring points define the closure pressure profile shown in FIG. 4, where 401 refers to the breaking strengths of the capsules concentrations, 402 refers to the fracture closure pressure profile, 404 refers to the concentration threshold of the marker agent (for detection), 405 refers to the profiles of the concentrations of the marker agents sampled from the well. The aforementioned profile of the fracture closure pressure that characterizes the interdependence between the time points of the corresponding marker agents detection and the fracture closure pressure caused by the fracture closure is provided to the user for analysis, for example, by sending it to a display device, or stored for further use.

The present disclosure provides as follows:

Low measurement cost: neither additional hydraulic fracturing nor downhole equipment. The measurements comes to the analysis of fluid samples taken at the surface.

Uninterrupted well operation during measurements: no intervention to well operation or production shutdown.

Long-term monitoring of the closure pressure in the formation: selection of suitable capsule breaking strengths and the number of the markers agents allow monitoring the pressure during the entire period of well operation.

It is apparent that the above embodiments not be regarded as a limitation of the patent claims scope. It is clear for a person skilled in the art that it is possible to make many changes to the technique described above without departing from the principles of the claimed.

The invention claimed is:

1. A method of determining the fracture closure pressure in a formation penetrated by a wellbore, wherein:
   the wellbore is provided;
   the clean fracturing fluid is injected into the wellbore, thus creating at least one fracture in the formation;
   the fracturing fluid is injected into at least one well, wherein the fracturing fluid comprises a mixture of a proppant and one or more groups of capsules, which comprises one or more capsules with a predetermined range of breaking strengths and that comprise a marker agent, which corresponds to each predetermined range of breaking strength values;
   wherein the capsules from different groups comprise different marker agents;
   wherein the capsules are designed to settle in the fracture and release the marker agent when the fracture closure pressure exceeds the predetermined range of breaking strength values caused by the fracture closure;
   the marker agent production to the surface is provided;
   the marker agent is detected at the surface; and
   the fracture closure pressure is determined according to the detected marker agent based on the range of breaking strength values of a capsule in the corresponding group of capsules.

2. The method according to claim 1, wherein the capsule is spherical or cylindrical.

3. The method according to claim 2, wherein the capsule is coated with a hard shell that sets the predetermined range of breaking strength values.

4. The method according to claim 2, wherein irregularities are provided in the external or internal surface of the hard shell that predetermine the range of breaking strength values.

5. The method according to claim 4, wherein the irregularities are furrows or grooves.

6. The method according to claim 2, wherein the cylindrical capsule is further coated with an insulating shell that serves to protect the capsule from the impact of the downhole conditions on the marker agents.

7. The method according to claim 1, wherein the marker agent is a substance selected from the group comprising trifluorobenzene, rhodamine, flourobenzoic acids, polynuclear aromatic hydrocarbons, and halogenated hydrocarbons.

8. The method according to claim 1, wherein the marker agent is a radioactive sub stance.

9. The method according to claim 1, wherein the marker agent production to the surface is provided during the flowback of the fracturing and clean-up fluid, wherein the samples of the fracturing fluid or the clean-up fluid are taken and used for determining the concentration of the marker agent in the sample.

10. The method according to claim 9, wherein the time point when the concentration of the predetermined marker agent exceeds the predetermined threshold concentration range is determined.

11. The method according to claim 10, wherein the predetermined threshold range of breaking strength values is set to minimal concentration of the marker agent in the sample detectable with the equipment used for detecting and measuring the concentration of the marker agent in the sample taken.

12. The method according to claim 1, wherein a certain marker agent corresponds to the fracture closure pressure caused by the fracture closure at a given time point.

13. The method according to claim 12, wherein a user is provided with the fracture closure pressure profile characterizing the relationship between the time points of determining the corresponding marker agents and the fracture closure pressure caused by the fracture closure.

14. A method of determining the fracture closure pressure in a reservoir penetrated by a wellbore, wherein:
    the wellbore is provided in the reservoir with at least one fracture, which comprises one or more groups of capsules comprising one or more capsules with the predetermined range of breaking strength values and a marker agent that corresponds to the predetermined range of breaking strength values;
    wherein the capsules from different groups comprise different marker agents;
    wherein the capsules are designed to precipitate in the fracture and release the marker agent in case the fracture closure pressure exceeds the predetermined range of breaking strength values caused by the fracture closure;
    the marker agent production to the surface is provided during the hydrocarbon production;
    the marker agent is detected at the surface; and
    the fracture closure pressure that corresponds to the detected marker agent is determined based on the breaking strength value of the capsule in the corresponding group of capsules.

15. The method according to claim 14, wherein the marker agent is a substance selected from the group comprising trifluorobenzene, rhodamine, flourobenzoic acids, polynuclear aromatic hydrocarbons, and halogenated hydrocarbons.

* * * * *